United States Patent [19]

Price

[11] Patent Number: 5,042,638

[45] Date of Patent: Aug. 27, 1991

[54] ICE CREAM SANDWICH COLLATING APPARATUS

[75] Inventor: Floyd W. Price, Freehold, N.J.

[73] Assignee: Interbake Foods, Inc., Elizabeth, N.J.

[21] Appl. No.: 642,400

[22] Filed: Jan. 17, 1991

Related U.S. Application Data

[63] Continuation-in-part of Ser. No. 474,627, Jan. 29, 1990, Pat. No. 4,989,270, which is a continuation of Ser. No. 201,563, Jun. 2, 1988, abandoned.

[51] Int. Cl.$^5$ .............................................. B65G 29/00
[52] U.S. Cl. .................. 198/430; 198/468.1; 198/746
[58] Field of Search ............ 198/730, 430, 746, 468.1, 198/374, 429

[56] References Cited

U.S. PATENT DOCUMENTS

| | | | |
|---|---|---|---|
| 1,650,900 | 11/1927 | Mayers | 198/430 |
| 2,983,361 | 5/1961 | Tibbals | 198/430 |
| 3,232,410 | 2/1966 | Teago | 198/803.5 X |
| 3,294,257 | 12/1966 | Davies et al. | 198/374 X |
| 3,669,283 | 6/1972 | Brown, Jr. | 198/374 X |
| 3,724,639 | 4/1973 | Hara | 198/430 |
| 3,820,302 | 6/1974 | Doran et al. | 198/374 X |
| 3,863,788 | 2/1975 | Meyer | 198/401 X |
| 4,018,328 | 4/1977 | Galarowic et al. | 198/747 X |
| 4,214,655 | 7/1980 | Bernham et al. | 198/403 X |
| 4,228,886 | 10/1980 | Moran | 198/401 X |
| 4,265,354 | 5/1981 | Sinnema | 198/374 |
| 4,340,137 | 7/1982 | Foster | 198/468.1 X |
| 4,517,791 | 5/1985 | Focke | 198/374 X |
| 4,756,400 | 7/1988 | Funo et al. | 198/430 X |
| 4,836,386 | 6/1989 | Smith | 198/468.1 X |

FOREIGN PATENT DOCUMENTS

2427317  12/1975  Fed. Rep. of Germany ... 198/468.1

Primary Examiner—Joseph E. Valenza
Assistant Examiner—Cheryl L. Gastineau
Attorney, Agent, or Firm—Klauber & Jackson

[57] ABSTRACT

Apparatus for collating ice cream sandwiches for packaging, includes a substantially flat dead plate; a conveyor which conveys the sandwiches in a first direction onto the dead plate; an optical detector which detects when a predetermined number of the sandwiches have been conveyed to a first position on the dead plate; a rodless air cylinder mounted above the dead plate and including a sliding plate for movement therealong and opposite air ports for controlling movement of the sliding plate by pressurized air supplied thereto; a mounting bracket fixed to the underside of the sliding plate and extending therefrom in a cantilevered manner; a pusher plate pivotally mounted by a pivot rod to the underside of the mounting bracket and retrained from moving past a limit position in a first direction by a stop pin secured to the mounting bracket, such that upon detection of a predetermined number of ice cream sandwiches on the dead plate by the detector, the sliding plate is caused to move from a start position to an end position such that the pusher plate biases the ice cream sandwiches off of the dead plate onto boxer infeed chute and upon reaching the end position, pressurized air is supplied to the opposite air port so as to quickly move the sliding plate back to its start position, whereupon the pusher plate is forced to pivot out of the way of incoming sandwiches substantially solely by air pressure without any mechanical devices so that subsequent articles can be conveyed onto the flat plate during movement of the pusher plate from the end position to the start position.

20 Claims, 6 Drawing Sheets

ICE CREAM SANDWICH COLLATING APPARATUS

REFERENCE TO RELATED APPLICATION

The present Application is a Continuation-In-Part of U.S. patent application Ser. No. 07/474,627, U.S. Pat. No. 4,989,720 filed Jan. 29, 1990, to Floyd W. Price and Harry Watson Sloan, having a common Assignee herewith, and entitled ICE CREAM SANDWICH COLLATING APPARATUS which, in turn, is a continuation of U.S. patent application Ser. No. 07/201,563, filed June 2, 1988, abandoned. The above two Copending Patent Applications are incorporated herein by reference in their entireties.

BACKGROUND OF THE INVENTION

This invention relates generally to apparatus for collating articles for packaging and, more particularly, is directed to apparatus for collating wrapped ice cream sandwiches for packaging.

Conventionally, after an ice cream sandwich has been wrapped, it is placed on an endless conveyor belt with other wrapped ice cream sandwiches and serially moved along with the conveyor belt. The conveyor belt terminates in a dead plate onto which the ice cream sandwiches are deposited. As each wrapped ice cream sandwich is deposited on the dead plate, it pushes the ice cream sandwiches already on the dead plate further therealong. The wrapped ice cream sandwiches are then pushed off the dead plate onto a pair of pivoted wing plates. When a predetermined number of wrapped ice cream sandwiches, for example, three or four, are pushed onto the wing plates, the conveyor operation is stopped, and the wing plates open up to drop the wrapped ice cream sandwiches thereon onto a platform, the dropped ice cream sandwiches then being pushed by a pusher bar into a box for packaging.

However, such arrangement provides distinct disadvantages. In the first place, the distance that the wrapped ice cream sandwiches have to travel from the dead plate onto the wing plates is an extra 12 to 14 inches. Because of such distance, the amount of time necessary for collating the wrapped ice cream sandwiches adds cost and time to the operation and/or mis-operation. In addition, when the wing plates open to drop the wrapped ice cream sandwiches onto the lower platform, the wrapped ice cream sandwiches sometimes tilt or deflect or are caught on the wing plates, which causes further delay in the operation and/or mis-operation. A third problem that results with such arrangement is that a four and one-half inch clearance between the lower platform and the surface of the closed wing plates is generally necessary in order to provide clearance for the opening of the wing plates. Because the ice cream sandwiches drop such a great distance, there is more apt to be problems with misalignment and the like, and there is further delay involved. Lastly, there is a further delay in the operation since the conveyor belt cannot begin movement to push more wrapped ice cream sandwiches onto the wing plate until the wing plates have closed.

Accordingly, the aforementioned arrangement has presented distinct disadvantages in the collating of wrapped ice cream sandwiches for packaging purposes.

U.S. Pat. No. 3,294,257 to Davies et al. discloses a package handling apparatus including a pusher mechanism in which the pusher is moved vertically out of the way during the return stroke so as not to interfere with further incoming packages. Specifically, the packages in this Patent are conveyed to a receiving station comprised of a series of elongated rollers that are spaced apart from each other. In this regard, it is noted that the packages are of a relatively larger size than the wrapped ice cream sandwiches according to the present invention.

An intermittently operated ejector mechanism is provided for clearing the receiving station and, more specifically, of clearing the rollers of any row of packages deposited thereon. The ejector mechanism includes a series of dog arms having ends projecting above the plane defined by the tops of the rollers and positioned between adjacent rollers. A mechanism is provided for moving the dog arms in a first direction along the lengthwise direction of the rollers to eject the packages on the rollers onto another conveyor assembly. The dog arms are then returned to their original position. In order to accommodate the flow of packages into the receiving station during return of the dog arms, the dog arms are lowered prior to their return to a height lower than the tops of the rollers so that the ends do not impede the flow of other packages onto the receiving station.

However, such apparatus could not be used for the handling of wrapped ice cream sandwiches. In the first place, the ends of the dog arms assume specific point contact with the ice cream sandwiches which could dent or damage the wrapped ice cream sandwiches. Further, the wrapped ice cream sandwiches could not be used with the elongated rollers in the receiving station. Specifically, it is necessary to position the ice cream sandwiches on a flat plate to prevent the wrapped ice cream sandwiches being caught or trapped between elongated rollers. As such, if a flat plate is used, the dog arms in Davies et al. could not be used with wrapped ice cream sandwiches, and it is clear in the discussion in Davies et al. that the packages are much different.

U.S. Pat. No. 3,820,302 to Doran et al. discloses carton casing apparatus which is similar to the aforementioned disclosure in Davies et al. Specifically, a series of stationary bars are intermeshed in a cone-like manner, with a series of four reciprocal bars which are movable vertically and longitudinally with respect to the stationary bars. When a predetermined number of cartons have been transferred to the stationary bars, the reciprocal bars are moved vertically upward so as to engage the cartons, and then tabs which are also moved to an upward position at such time, are used for transferring the cartons to a point beneath a gripping-head assembly. The tabs are similar to the dog arms of the Davies et al. Patent. However, as with Davies et al., the apparatus of Doran et al. could not be used with wrapped ice cream sandwiches since it is necessary to provide a substantially flat plate onto which the sandwiches are deposited. In such case, the tabs of Doran et al. could not be used.

German Patent No. 2,427,317 discloses a pusher for pushing a buffer stock of items off a feed conveyor. The pusher is mounted on an assembly which moves the pusher vertically with respect to the conveyor so that the pusher is moved upwardly out of the way of incoming items when moved from its extended to its retracted position so that, during its return stroke, it does not interfere with subsequent articles. However, because of this arrangement, it is necessary to provide a second drive mechanism, that is, the vertical drive mechanism which vertically moves the entire pusher assembly upward during its return stroke. This greatly complicates the arrangement and adds to the cost thereof. Further, with this arrangement, there is a delay in the operation until the pusher mechanism is raised to a sufficient height to permit new stock to be fed to the pusher position.

U.S. Pat. No. 3,724,639 to Hara discloses a pusher mechanism which pushes articles off a first conveyor across a flat plate and onto a receiving conveyor. A control means pivotally moves the pusher so that when the pusher is retracted, it does not interfere with the conveyance of the subsequent articles. However, as with the aforementioned devices, a relatively complicated mechanical arrangement must be provided for moving the pusher out of the way of incoming articles.

In this regard, related assemblies are shown in U.S. Pat. Nos. 1,650,900 to Mayers; 2,983,361 to Tibbals; and 3,669,283 to Brown, Jr. Tibbals discloses an arrangement in which a pusher which pushes articles across and off a belt is pivotally mounted through a shuttle plate and includes a cam roller or follower secured thereto. A lower stationary cam track is provided, and the cam follower is biased to ride along the upper guide edge of the cam track so as to maintain the pusher in the lower position for transversely pushing the articles off the conveyor. At the end of the pushing stroke, the cam roller rides under a cam nose which is pivoted upwardly about a pivot pin, whereupon the cam nose falls back down at the end of the stroke. During the return stroke, the cam roller rides along the upper inclined forward cam face of the cam nose and is biased upwardly so as to ride along the upper cam track. As a result, the pusher is raised above the level of the articles on the conveyor so as not to interfere with subsequent movement of the articles along the conveyor. This arrangement is similar in general respects to the invention of the Parent in the present Application. However, there is still the need for a relatively complicated mechanical arrangement for moving the pusher out of the way during its return stroke.

U.S Pat. No. 4,018,328 to Galarowic et al. discloses a transfer shuttle using a pusher dog which is pivotally attached so as to extend in a path of motion of a workpiece transfer member which is supported along support rails. Thus, the dog can push the member along the support rail and during its return path, it hits the next work piece and is biased downwardly so as not to interfere with any further movement thereof. At the beginning position, the dog engages a finger which again knocks it to its upward position. However, this Patent requires a mechanical force to move it between its two positions. Further, the mechanical dog actually hits upon the work piece which would be undesirable for use with ice cream sandwiches which are of a much lighter weight and which are deformable.

U.S. Pat. No. 4,836,386 to Smith discloses a sorting system for moving tires and has an arm member with a hand thereon for moving the tires off of the conveyor onto a stack of tires. However, during the return stroke, an actuating cylinder is adapted to rotate a lever arm which is fixedly attached to the arm member and which therefore brings the arm member into a retracted position. This would be unduly burdensome and complicated for use with ice cream sandwiches.

U.S. Pat. No. 30,742 to Weir discloses an arrangement in which an arm is pivotally moved into and out of engagement with cans by a piston-cylinder arrangement, and again, presents a relatively complicated mechanical arrangement. See also U.S. Pat. No. 4,340,137 to Foster.

However, with all of the above Patents, a mechanical arrangement is required to move the pusher mechanism out of the way of incoming articles during its retraction stroke.

Other handling apparatus are shown in U.S. Pat. Nos. 3,232,410 to Teago; 3,863,788 to Meyer; 4,214,655 to Bernham et al.; 4,265,354 to Sinnema; 4,228,886 to Moran; and 4,517,791 to Focke; and 4,756,400 to Funo et al. However, these latter Patents are less relevant than the above Patents, and in fact, do not move the plunger out of the way when moving from the extended position to the retracted position. Funo et al. also discloses a sensor which senses the leading end of a row of articles having a predetermined number of articles on the conveyance line. After the sensor senses the leading article of the row, the row of articles is separated from the other articles on the conveyance line.

OBJECTS AND SUMMARY OF THE INVENTION

Accordingly, it is an object of the present invention to provide ice cream sandwich collating apparatus that overcomes the aforementioned problems with the prior art.

More particularly, it is an object of the present invention to provide ice cream sandwich collating apparatus in which the distance that the wrapped ice cream sandwiches must be pushed is reduced.

It is another object of the present invention to provide an ice cream sandwich collating apparatus which eliminates the need for any wing plates.

It is still another object of the present invention to provide ice cream sandwich collating apparatus in which the drop from the dead plate to the platform is one and one-half to two and one-half inches as opposed to the four and one-half inch clearance necessary in the prior art.

It is yet another object of the present invention to provide ice cream sandwich collating apparatus in which there is no delay in the conveying and pushing operations.

It is a further object of the present invention to provide an ice cream sandwich collating apparatus in which the pusher member is returned to its original starting position simultaneously with the conveying of new ice cream sandwiches onto the dead plate.

It is a still further object of the present invention to provide an ice cream sandwich collating apparatus in which the pusher member moves out of the way of incoming ice cream sandwiches during its return stroke.

It is a yet further object of the present invention to provide an ice cream sandwich collating apparatus in which the pusher member is freely pivotable so that it pivots out of the way above the ice cream sandwiches, substantially solely by means of air pressure, during its return stroke.

In accordance with an aspect of the present invention, apparatus for collating articles for packaging, includes a substantially flat plate; conveying means for conveying the articles in a first direction onto the flat plate; detector means for detecting when a predetermined number of the articles have been conveyed to a first position on the flat plate; pusher means for pushing the predetermined number of articles from the first position to a second position so as to collate the pushed articles; mounting means for freely pivotally mounting the pusher means above the flat plate for movement between a start position and an end position in a second direction substantially transverse to the first direction, the start position corresponding to the first position and the end position corresponding to the second position; and control means for moving the pusher means from the start position to the end position so as to move the articles from the first position to the second position, and for moving the pusher means back from the end position to the start position in a manner to cause the pusher means to pivot out of the way of incoming articles substantially solely by air pressure and without any mechanical means, where in subsequent articles can be conveyed onto the flat plate during movement of the pusher means from the end position to the start position.

The above and other objects, features and advantages of the present invention will become readily apparent from the following detailed description thereof which is to be read in connection with the accompanying drawings.

DETAILED DESCRIPTION OF A PREFERRED EMBODIMENT

Figure 1:
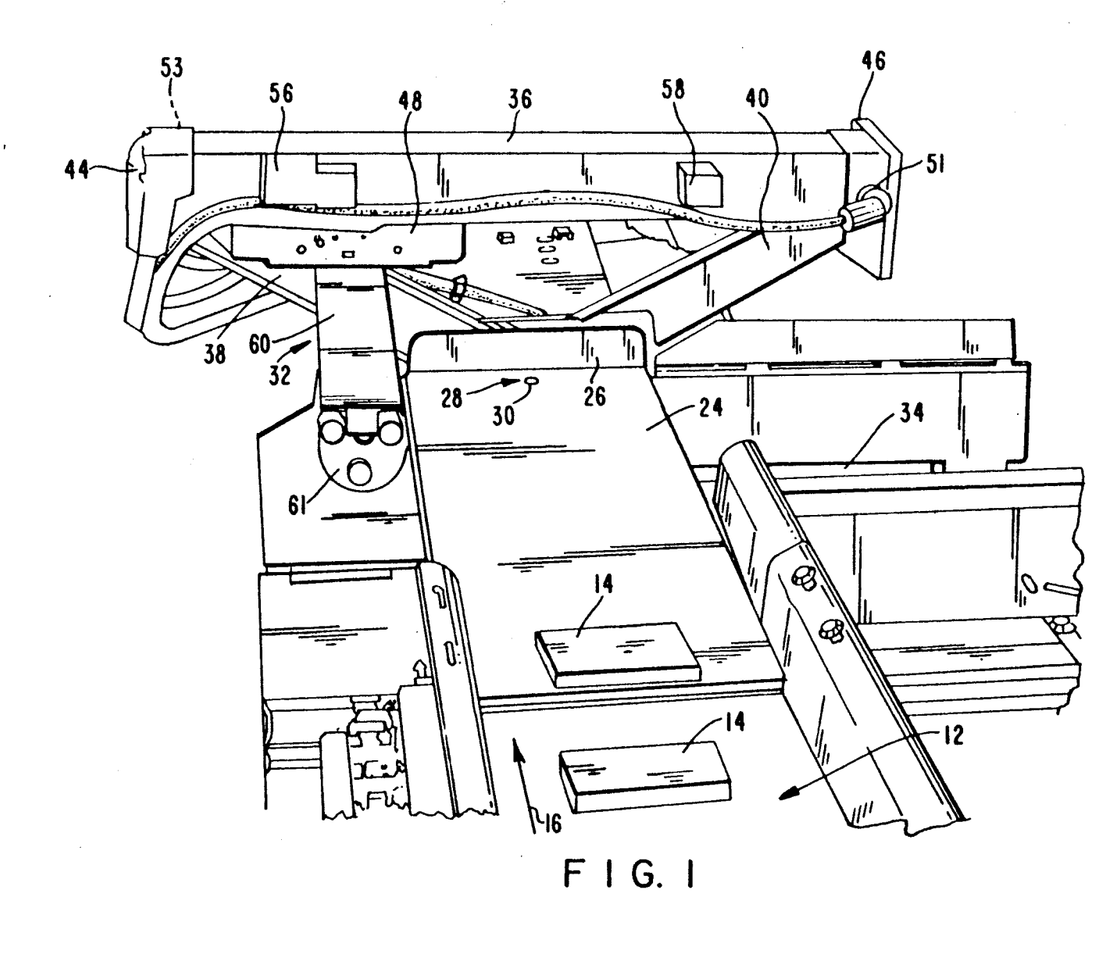
FIG. 1 is a front perspective view of the ice cream sandwich collating apparatus according to the present invention.
Figure 2:
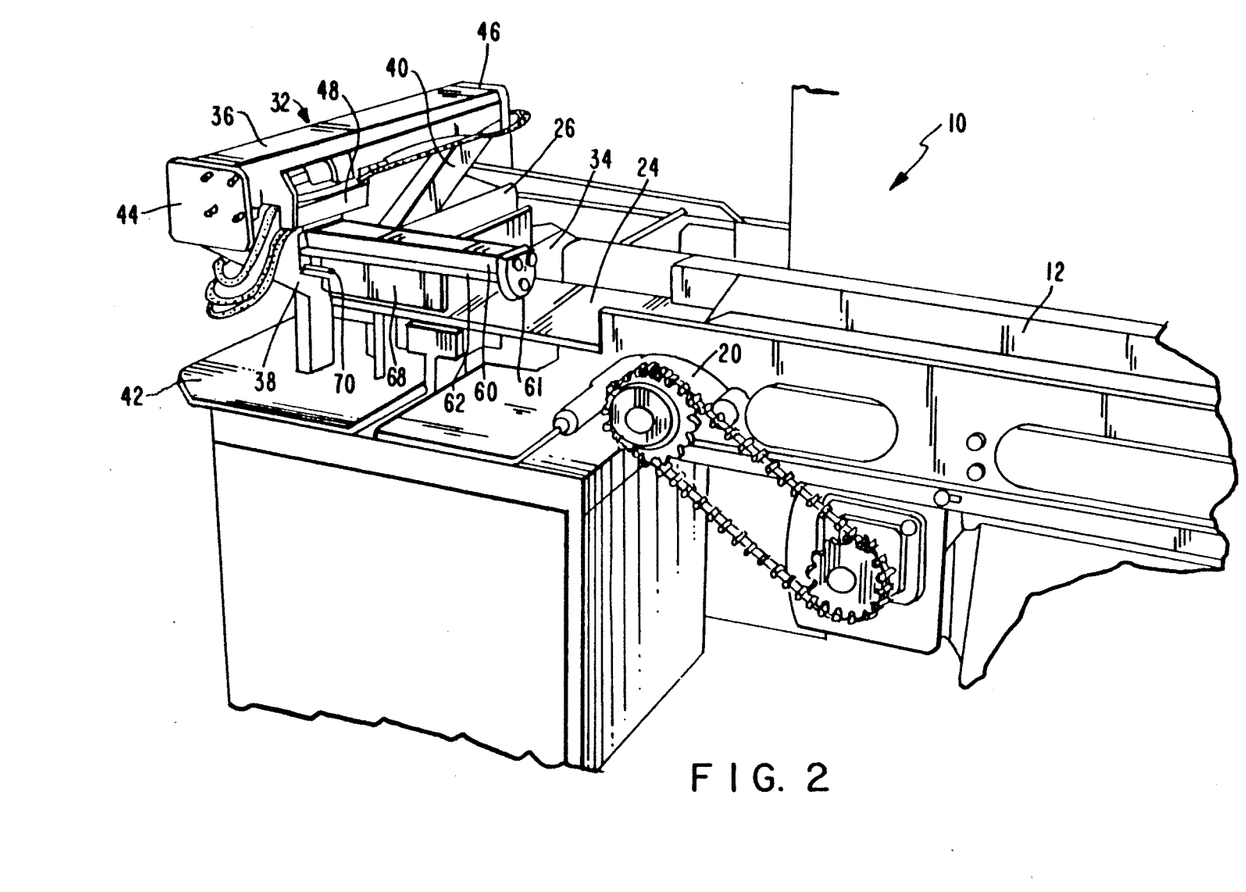
FIG. 2 is a side perspective view of the apparatus of FIG. 1.

Referring to the drawings in detail, and initially to FIGS. 1 and 2 thereof, an ice cream sandwich collating apparatus 10 according to the present invention includes a conveyor assembly 12 which conveys wrapped ice cream sandwiches 14 in linear, spaced-apart relation thereon, as is conventional, in the direction of arrow 16. Conveyor assembly 12 is conventional and includes end pulleys 20, only one being shown, having an endless belt (not shown) wrapped thereabout. The wrapped ice cream sandwiches 14 ride on the upper surface of endless belt 22. The forwardmost end of endless belt 22 terminates at the rear end of a substantially flat dead plate 24. As each next wrapped ice cream sandwich 14 is deposited at the rear end of dead plate 24, such deposited ice cream sandwich 14 pushes the already deposited ice cream sandwiches further along dead plate 14 in the direction of arrow 16. This operation continues until the forwardmost wrapped ice cream sandwich 14 abuts against sandwich stop and guide 26, shown as an L-shaped end of plate 24.

A sandwich detecting mechanism 28 is provided with dead plate 24, immediately adjacent sandwich stop and guide 26 and in line with the conveyed ice cream sandwiches 14. Specifically, detecting mechanism 28 includes an electric eye, or the like. For example, detecting mechanism 28 includes an aperture 30 in dead plate 24. A light emitting diode or the like (not shown) shines a beam of light through aperture 30 which is received by a photo-transistor (not shown) below aperture 30, as is well-known in the art. When no ice cream sandwich is in covering relation to aperture 30, the phototransistor detects the light from the light emitting diode and does not actuate a pushing mechanism. When the forwardmost ice cream sandwich 14 is pushed into covering relation to aperture 30 and thereby, against sandwich stop and guide 26, the light path is broken such that the phototransistor sends a signal to initiate the pushing operation, which will be discussed in detail hereinafter.

Apparatus 10 further includes a pusher mechanism 32 which pushes a predetermined number of ice cream sandwiches in a direction substantially transverse to that of arrow 16, that is, along sandwich stop and guide 26 and onto an infeed chute 34, whereupon the wrapped ice cream sandwiches 14 are ready to be pushed into a box for packaging. In such case, it is ideally considered that either three of four wrapped ice cream sandwiches will be pushed by pusher mechanism 32. Thus, for example, it is possible to provide a twelve-pack of wrapped ice cream sandwiches by layering three rows of four ice cream sandwiches on each other. As another example, it is possible to provide a six-pack of wrapped ice cream sandwiches by layering two rows of three ice cream sandwiches on each other. With this arrangement, it is only necessary to provide a height difference between dead plate 24 and the platform (not shown) at the lower end of the infeed chute 34 of one and one-half inches for two layers or two and one-half inches for three layers of wrapped ice cream sandwiches. This distance is much less than the four and one-half inch clearance necesary for the wing plates of the prior art, and accordingly, there is less of a delay in the collating of the ice cream sandwiches. Once the wrapped ice cream sandwiches have been layered on the platform at the lower end of infeed chute 34, a second pusher (not shown) is provided to push the layered ice cream sandwiches into a box for packaging.

Pusher mechanism 32 will now be discussed in detail. Specifically, pusher mechanism 32 includes an air cylinder 36 that is supported at opposite ends thereof above dead plate 24 by cylinder supports 38 and 40, which are mounted at their lower ends on a rear cylinder support frame 42 which forms part of the framework of apparatus 10. Cylinder support brackets 44 and 46 are secured at the upper ends of cylinder supports 38 and 40, respectively, and secure opposite ends of air cylinder 36 therebetween.

Air cylinder 36 has a slidable piston 37 therein which is sealed by seal elements 39 to the inner wall of cylinder 36. Piston 37 supports a sliding plate 48 externally at a lower end thereof for sliding movement therealong. Generally, air cylinder 36 is conventional, and sliding plate 48 slides along air cylinder 36 in dependence on the direction of pressurized air supply to air cylinder 36. For example, air cylinder 36 can be a conventional rodless air cylinder such as that sold by Origa Corporation, 928 Oak Lawn, Elmhurst, Ill. 60126 under Model No. P202/20 58732-90, having a 25 mm diameter and a seven-inch stroke.

In this regard, pressurized air is supplied from a compressed air supply 50 (FIG. 7) to a power valve 54 that controls the supply of pressurized air to a first air port 51 at one end of air cylinder 36 or to the opposite end of air cylinder 36 through a second air port 53, as will be described in greater detail hereinafter. Thus, when pressurized air is supplied through first air port 51 to the right-hand end of air cylinder 36 as seen in FIG. 1, sliding plate 48 is caused to move to the left of air cylinder 36, that is, piston 37 moves down in FIG. 7 in the direction of arrows 41. In like manner, when pressurized air is supplied through second air port 53 to the opposite end of air cylinder 36, sliding plate 48 is caused to move from the left to the right of FIG. 1, that is, piston 37 moves up in FIG. 7. In addition, the opposite ends of air cylinder 36 are provided with reed switches 56 and 58, respectively, to detect movement of sliding plate 48 to the respective opposite ends of air cylinder 36. Reed switches 56 and 58 can, for example, be series RS proximity switches sold by the aforementioned Origa Corporation.

A pivot bracket 60 is secured at the underside of sliding plate 48 and extends transversely therefrom in a cantilevered manner. Pivot bracket 60 includes downwardly extending end plates 61, with a pivot rod 62 extending thereacross which pivotally supports a pusher plate 68. Normally, pusher plate 68 depends vertically downwardly from one edge thereof by reason of gravity.

Figure 3:
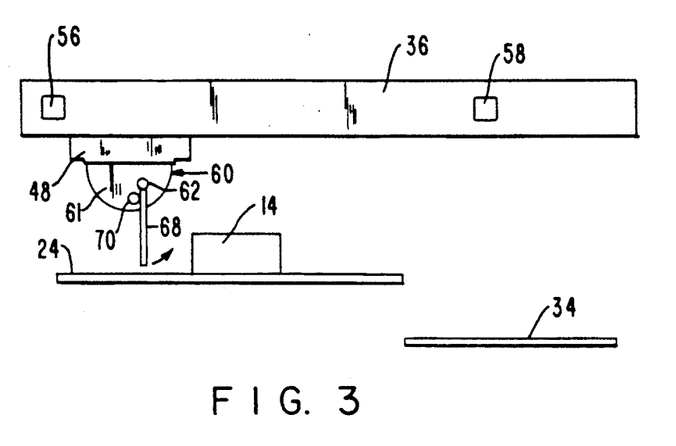
FIG. 3 is a schematic, partial cross-sectional view of the apparatus of FIG. 1, showing the pusher plate at the start position.

In this regard, as shown best in FIGS. 2 and 3, a stop pin 70 extends in a cantilevered manner from one end of pivot bracket 60 so as to prevent clockwise movement of pusher plate 68, as shown in FIG. 3, past the vertically downwardly hanging position shown therein. In this manner, when sliding plate 48 moves from the left to the right in FIG. 1, pusher plate 68 engages the edges of a row of three or four adjacent and abutting wrapped ice cream sandwiches 14 so as to move the same along dead plate 24 and onto infeed chute 34. This is because pusher plate 68 is maintained in its vertically downwardly hanging position by stop pin 70 when pushing the wrapped ice cream sandwiches along dead plate 24 onto infeed chute 34.

Figure 4:
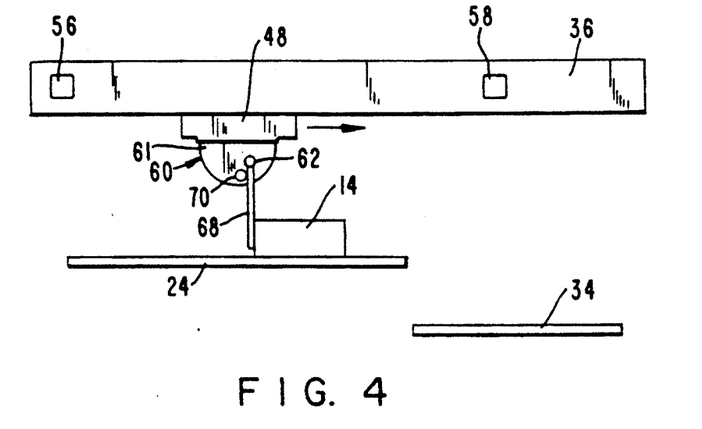
FIG. 4 is a schematic, partial cross-sectional view of the apparatus of FIG. 1, showing the pusher plate starting to push the ice cream sandwiches off of the dead plate.
Figure 5:
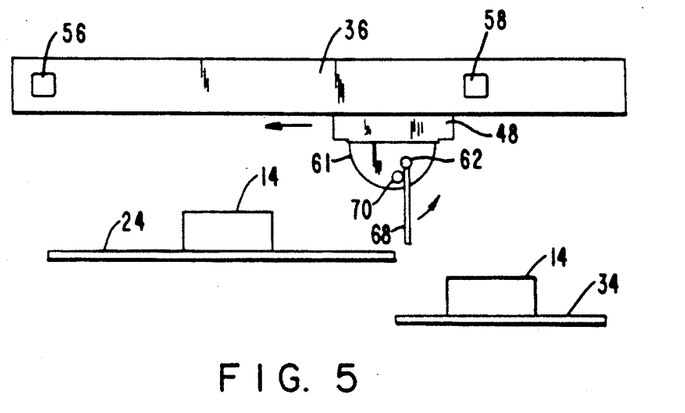
FIG. 5 is a schematic, partial cross-sectional view of the apparatus of FIG. 1, showing the pusher plate at the end position, beginning its return to the start position.
Figure 6:
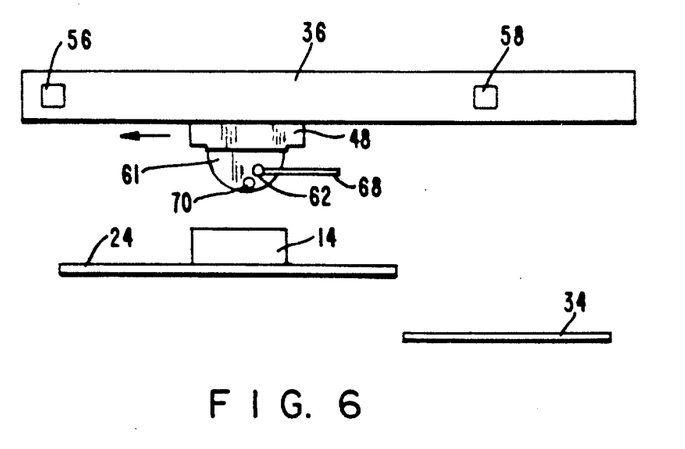
FIG. 6 is a schematic, partial cross-sectional view of the apparatus of FIG. 1, showing the pusher plate being returned to the start position and with external air pressure forcing the pusher plate to a horizontal position above incoming ice cream sandwiches.

In accordance with the present invention, when sliding plate 48 moves from the left to right side of FIG. 1, as shown in FIGS. 3-5, pusher plate 68 engages the rear edges of a plurality of wrapped ice cream sandwiches 14 on dead plate 24 and pushes the same therealong to the right side of FIG. 1 onto infeed chute 34. During the return travel of pusher plate 68, sliding plate 48 is moved back at a greater speed such that air pressure pivots the freely pivotable guide plate 68 to the horizontal position shown in FIG. 6. In other words, pusher plate 68 takes the path of least resistance, and accordingly, substantially solely by means of air pressure, is pivoted to the horizontal dashed line position above the upper surfaces of incoming wrapped ice cream sandwiches 14 so as not to interfere therewith. Thus, during the return of pusher plate 68, wrapped ice cream sandwiches 14 can be continuously pushed onto dead plate 24 so that when pusher plate 68 returns to its initial position as shown in FIG. 3, pusher plate 68 falls back down by gravity to the vertically downwardly hanging position shown in FIG. 3, whereupon pusher plate 68 is again ready to push a plurality of wrapped ice cream sandwiches 14 off of dead plate 24 and onto infeed chute 34. This results in a considerable amount of time saved since the ice cream sandwiches 14 can continuously be pushed onto dead plate 24 and need not stop for the return of pusher plate 68.

In addition, this arrangement provides a great advantage over the arrangement of the Parent of &:he present Application and related devices in which a mechanical arrangement must be provided for moving the pusher plate between an operative position and an inoperative position. As will be appreciated, the present invention greatly reduces the complexity and cost: of the present apparatus over existing systems.

Figure 7:
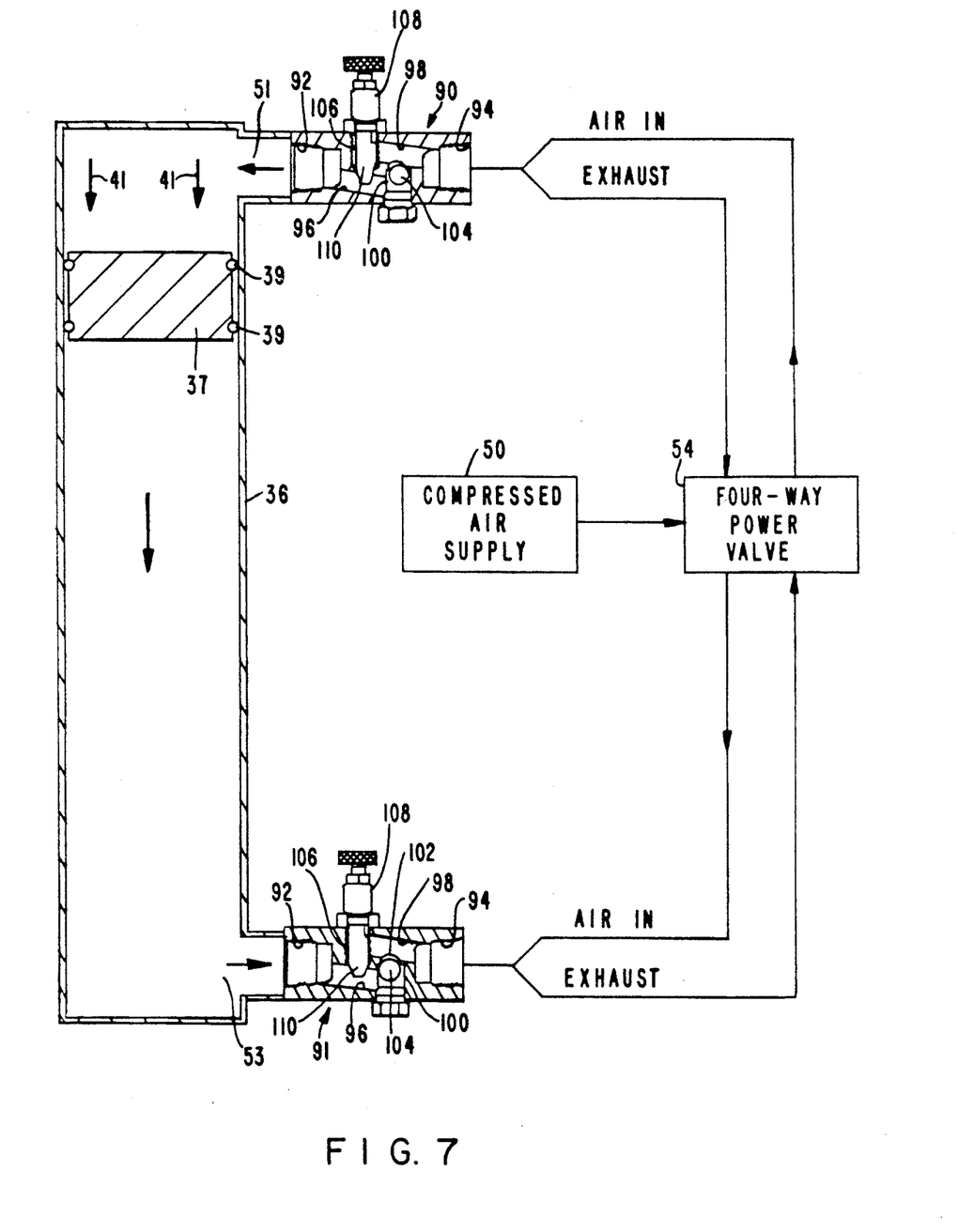
FIG. 7 is a cross-sectional and block diagram of the air cylinder and the control arrangement therefor.

In order to provide movement of sliding plate 48 during its return stroke to its start position at a greater speed than during the pushing operation, reference will now be made to FIG. 7. As shown therein, a flow control valve 90 is connected with air port 51, and a flow control valve is connected with air port 53. As shown, flow control valves 90 and 91 each include a cup-shaped recess 92 in fluid communication with the respective air port 51 or 53 at one end thereof and a cup-shaped recess 94 at the opposite end thereof for receiving the compressed air and for exhausting air therefrom. Recess 92 is in fluid communication with a first lengthwise passageway 96 which extends slightly past the mid-point of the flow control valve, and, in like manner, a second lengthwise passageway 98 is provided in substantially parallel, spaced relation to passageway 96 and extending from recess 94 to a point slightly past: the mid-point of the flow control valve. Accordingly, &:here is some overlap of passageways 96 and 98 at the mid-section of flow control valves 90 and 91. Passageways 96 and 98 are connected by a first transverse passageway 100 which starts at the free end of passageway 96. A ball seat 102 is provided at a position where transverse passageway 100 meets passageway 98 and a ball 104 is provided in transverse passageway 100. A second transverse passageway 106 is provided in spaced, parallel relation at the end of passageway 98 and interconnects passageways 96 and 98. A needle valve housing 108 is mounted externally of the flow control valve in fluid communication with second transverse passageway 106. A needle valve 110 is threadedly mounted within needle valve housing 108 and extends through second passageway 106 with a spacing therebetween.

In accordance with the present invention, needle valve 110 of flow control valve 91 is unscrewed to a larger extent than needle valve 110 of flow contro! valve 90. Accordingly, greater air flow is permitted through second passageway 106 of control valve 91 than second passageway 106 of the other flow control valve 90.

During the pushing stroke, compressed air from compressed air supply 50 is supplied through four-way power valve 54 to flow control valve 90. As a result, the compressed air pushes ball 104 away from ball seat 102 so that the compressed air is supplied predominantly through second passageway 98, transverse passageway 100 and first passageway 96 of flow control valve 91, to air port 53. Accordingly, piston 37 is moved in the direction opposite to arrows 41, to the position shown in FIG. 7. At such time, the air at the opposite side of piston 37 is forced out through flow control valve 90. At such time, the exhaust air forces ball 104 into sealing arrangement with ball seat 102 to prevent air travel through transverse passageway 100. Accordingly, the exhaust air travels through first passageway 96, second transverse passageway 106 and second passageway 98 out of flow control valve 90.

During the return travel, the opposite operation occurs, whereby compressed air is supplied to air port 51 through second passageway 98, transverse passageway 100 and first passageway 96 of flow control valve 90 to force piston 37 in the direction of arrows 41. At such time, the air on the opposite side of piston 37 is exhausted through flow control valve 91 and, particularly, through first passageway 96, second transverse passageway 106 and second passageway 98, out of flow control valve 91.

It will be appreciated, however, that needle valve 110 is unscrewed to a greater extent so that the opening through second transverse passageway 106 of flow control valve 91 is greater than the opening through second transverse passageway 106 of flow control valve 90. As a result, there is less resistance to exhaust air during the return stroke so that piston 37 is caused to move at a much greater speed during its return stroke than during its pushing stroke.

Figure 8:
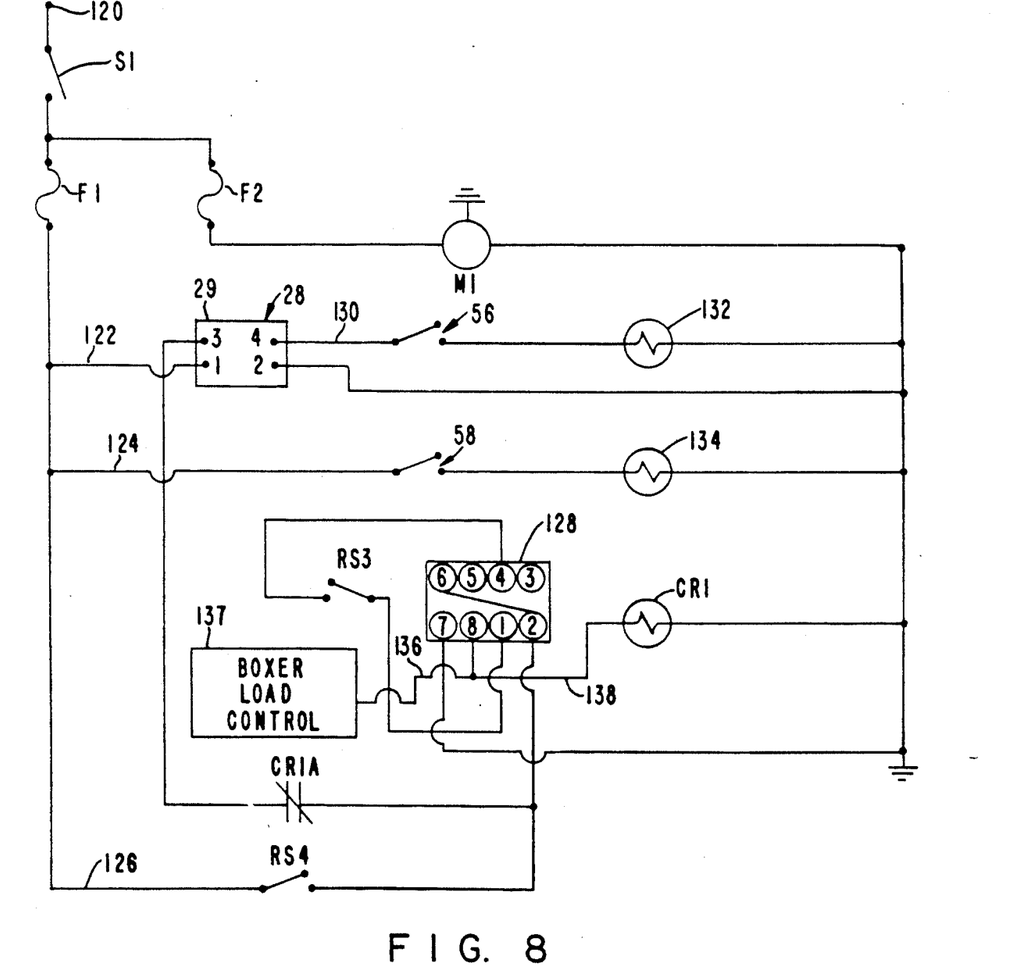
FIG. 8 is a block-circuit wiring diagram for controlling the apparatus of FIG. 1.

In order to control operation of piston 37 and thereby of sliding plate 48 and pusher plate 68, reference is now made to FIG. 8. As shown therein, a primary on/off switch S1 provides current from a current source 120, such as a 220 volt, 60 Hz, single phase current source, and through a 2 amp fuse F1. The current is supplied through lines 122, 124 and 126. It will be appreciated that there is an additional cylinder arrangement, namely for pushing the ice cream sandwiches that have traveled down chute 34, into a box for packaging. This boxer cylinder (not shown) has a boxer pusher (not shown). When the pusher is retracted to its start position, contact RS4 is closed so that current travels to a counter 128. Current also passes through contact RS4 and through a closed contact CR1A to a power block 29 of sandwich connecting mechanism 28. Power block 29 includes contacts 1 and 2 which are connected together and thereby closed when power is supplied along line 122 from current source 120. As the ice cream sandwiches cross dead plate 24 and cover aperture 30 therein, contacts 3 and 4 of power block 29 are connected together, thereby sending current to line 130.

Reed switch 56 is connected in line 130. When pusher plate 68 is at its start position for pushing ice cream sandwiches, reed switch 56 is closed so that current flows through reed switch 56 to a solenoid 132 which forms part of four-way power valve 54, which is a conventional arrangement. When solenoid 132 is energized, it moves to direct air from compressed air supply 50 to air port 53 in order to cause piston 37 to move in a direction opposite to arrows 41 in FIG. 7, thereby causing pusher plate 68 to push the ice cream sandwiches off of dead plate 24. At this time, the other solenoid 134 is positioned to provide receipt of exhaust air from air port 51.

As piston 37 reaches the opposite end of cylinder 36, it closes reed switch 58, whereby current is supplied from line 124 to solenoid 134. As a result, solenoid 134 moves so as to supply compressed air from compressed air supply 50 to air port 51. In such position, compressed air supply to solenoid 132 is, cut off, and solenoid 132 is positioned so that exhaust air exits air port 53, whereby piston 37 is moved in its return stroke.

A reed switch RS3 is positioned with reed switch RS2 and also closes when piston 37 reaches the end of its pushing stroke. As a result, a single count is added to a counter 128.

The above cycle is repeated until counter 128 reaches its set point. For example, if two layers of ice cream sandwiches are to be pushed into a box, upon reaching this count, contacts 6 and 8 of counter 128 close, sending current along line 136 to a boxer load control 137 which controls the boxer pusher which pushes the stacked ice cream sandwiches into a box. It will be remembered that contact RS4 is closed only as long as the boxer pusher is in its retracted position. Accordingly, at this time, contact RS4 opens. At the same time, current is sent to line 138 to control contact CR1 to open contact CR1A, which is an interlock that prevents closing of contacts 3 and 4 of power block 29 so that the apparatus cannot load any more bars onto loading chute 34.

Thereafter, when the boxer pusher returns to its retracted position, contact RS4 once again closes and supplies current in order to reset counter 128. As a result, contact CR1 is controlled to close contact CR1A so as to permit ice cream sandwiches to be pushed onto infeed chute 34, and the operation continues therefrom.

It will therefore be appreciated that the present invention provides distinct advantages over the prior art by eliminating substantial delays from prior art processes. Thus, because pusher plate 68 is moved above the upper surfaces of subsequent ice cream sandwiches that are moved onto dead plate 24, there is no delay in the apparatus. Further, there is no need for any mechanical apparatus for controlling movement of pusher plate 68, thereby reducing the complexity and cost of the apparatus.

In the event of high speed operations, a rubber curtain or the like can be secured to cylinder support bracket 46, to prevent the ice cream sandwiches from being pushed too hard.

Thus, the present invention permits collating of wrapped ice cream sandwiches at speeds up to 160 sandwiches per minute at a continuous flow. There is thus better control of individual sandwiches, better alignment of sandwiches for easier loading into cartons, less down time, and thereby, increased productivity.

Having described a specific preferred embodiment of the invention with reference to the accompanying drawings, it will be appreciated that the present invention is not limited to that precise embodiment, and that various changes and modifications can be effected therein by one of ordinary skill in the art without departing from the spirit or scope of the invention as defined by the appended claims.

What is claimed is:

1. Apparatus for collating articles for packaging, comprising:
   a substantially flat plate;
   conveying means for conveying the articles in a first direction onto the flat plate;
   detector means for detecting when a predetermined number of the articles have been conveyed to a first position on the flat plate;
   pusher means for pushing the predetermined number of articles from the first position to a second position so as to collate the pushed articles;
   mounting means for freely pivotally mounting the pusher means above the flat plate for movement between a start position and an end position in a second direction substantially transverse to the first direction, said start position corresponding to said first position and said end position corresponding to said second position; and control means for:
moving the pusher means from the start position to the end position so as to move said articles from said first position to said second position, and moving the pusher means back from the end position to the start position in a manner to cause the pusher means to pivot out of the way of incoming articles substantially solely by air pressure and without any mechanical means, wherein subsequent articles can be conveyed onto the flat plate during movement of the pusher means from the end position to the start position.

2. Apparatus according to claim 1; further including stop means for limiting pivotal movement of said pusher means in a pivoting direction away from said articles, when moving the pusher means from the start position to the end position so that said pusher means moves said articles from said first position to said second position.

3. Apparatus according to claim 2; wherein said pusher means includes a pusher plate freely pivotally mounted to said mounting means for pushing said predetermined number of articles from said first position to said second position.

4. Apparatus according to claim 3; wherein said stop means includes a stop pin fixedly mounted to said mounting means adjacent said pusher plate.

5. Apparatus according to claim 1; wherein said conveying means includes an endless conveyor belt and means for moving said conveyor belt, said conveyor belt terminating at said substantially flat plate.

6. Apparatus according to claim 1; further including stop and guide means for providing a limit position to which said articles are conveyed on said flat plate; and wherein said detector means is positioned adjacent said stop and guide means for detecting when a predetermined number of said articles have been conveyed to the first position, limited by said stop and guide means on said flat plate.

7. Apparatus according to claim 6; wherein said detector means includes optical means for optically detecting when a predetermined number of said articles have been conveyed to the first position on said flat plate.

8. Apparatus according to claim 7; wherein said optical means includes an aperture in said substantially flat plate adjacent said stop and guide means, and light emitting and light detecting means associated with said aperture for detecting when an article is in covering relation to said aperture.

9. Apparatus according to claim 6; wherein said stop and guide means includes means for guiding a frontmost one of said articles therealong from said first position to said second position.

10. Apparatus according to claim 1; wherein said mounting means includes opposite supports and air cylinder means mounted by said opposite supports above said flat plate and extending substantially in said second direction.

11. Apparatus according to claim 10; wherein said mounting means further includes sliding plate means slidably mounted along said air cylinder means for supporting said pusher means for movement in said second direction.

12. Apparatus according to claim 11; wherein said mounting means further includes pivot bracket means secured to said sliding plate means for freely pivotally mounting said pusher means such that said pusher means extends substantially in said first direction.

13. Apparatus according to claim 12; wherein said pusher means includes a pusher plate for pushing said predetermined number of articles from said first position to said second position.

14. Apparatus according to claim 13; wherein said control means includes air pressure supply means for supplying air to said air cylinder means under greater pressure during movement of the pusher means in the second direction from the end position to the start position in comparison with the air pressure supplied to said air cylinder means during movement of the pusher means from the start position to the end position, so that the pusher means pivots out of the way of incoming articles substantially solely by air pressure and without any mechanical means during movement from the end position to the start position.

15. Apparatus according to claim 11; wherein said control means includes first and second switch means at opposite ends of said air cylinder means for detecting when said pusher means has moved to said start position and said end position, respectively.

16. Apparatus according to claim 15; wherein at least one of said first and second switch means includes a reed switch mounted on said air cylinder means.

17. Apparatus according to claim 15; wherein said air cylinder means includes first port means for supplying pressurized air to one end of said air cylinder means and second port means at an opposite end of said air cylinder means for supplying pressurized air thereat.

18. Apparatus according to claim 17; wherein said control means further includes circuit means for controlling the supply of pressurized air to said first port means of said air cylinder means when said first switch means detects said pusher means at said start position and said detector means detects a predetermined number of articles that have been conveyed to said first position on said flat plate, and for controlling the supply of pressurized air to said second port means of said air cylinder means when said second switch means detects said pusher means at said end position.

19. Apparatus according to claim 18; wherein the pressure of said air supplied to said second port means is greater than the pressure of said air supplied to said first port means.

20. Apparatus according to claim 1; further including infeed chute means at said second position to carry said predetermined number of articles to a second pusher position.

* * * * *